(12) United States Patent
Weltlinger (10) Patent No.: US 8,401,527 B2
(45) Date of Patent: Mar. 19, 2013

(54) METHOD OF SIMULATING COMMUNICATION

(76) Inventor: Andrew M. Weltlinger, Baltimore, MD (US)

( * ) Notice: Subject to any disclaimer, the term of this patent is extended or adjusted under 35 U.S.C. 154(b) by 230 days.

(21) Appl. No.: 12/777,041

(22) Filed: May 10, 2010

(65) Prior Publication Data

US 2011/0275350 A1 Nov. 10, 2011

(51) Int. Cl.
*H04M 3/42* (2006.01)
(52) U.S. Cl. .......... 455/414.1; 455/567; 455/412.2; 345/173
(58) Field of Classification Search ........ 455/414.1, 455/567, 415, 413, 412.2; 345/173
See application file for complete search history.

(56) References Cited

U.S. PATENT DOCUMENTS

| | | | | |
|---|---|---|---|---|
| 5,930,757 | A * | 7/1999 | Freeman | 704/272 |
| 7,350,038 | B2 * | 3/2008 | Kikuchi et al. | 711/154 |
| 7,646,857 | B2 * | 1/2010 | Caputo et al. | 379/88.19 |
| 2004/0252814 | A1 * | 12/2004 | Eakin | 379/88.17 |
| 2006/0197752 | A1 * | 9/2006 | Hurst et al. | 345/173 |
| 2007/0067172 | A1 * | 3/2007 | Lee et al. | 704/257 |

FOREIGN PATENT DOCUMENTS

JP 2009-245049 * 10/2009

OTHER PUBLICATIONS

Williams, Protest Under 37 CFR 1.291, Jan. 10, 2011.*

* cited by examiner

*Primary Examiner* — Kamran Afshar
*Assistant Examiner* — Marisol Fahnert
(74) *Attorney, Agent, or Firm* — Rahman LLC (57) ABSTRACT

A method of simulating a conversation includes providing at least one pre-programmed conversational script on a storage device; selecting the at least one pre-programmed conversational script for playback on the mobile communications device at a predetermined time; receiving an incoming communications alert on the mobile communications device; reciting the selected at least one pre-programmed conversational script on the mobile communications device upon responding to the incoming communications alert; and simulating an authentic conversation through the mobile communications device using the at least one pre-programmed conversational script.

20 Claims, 5 Drawing Sheets

Provide at least one pre-programmed conversational script on a storage device. 70

Select the pre-programmed conversational script for playback on a mobile communications device at a predetermined time. 75

Receive an incoming communications alert on the mobile communications device. 80

Recite the selected at least one pre-programmed conversational script on the mobile communications device upon responding to the incoming communications alert. 85

Simulate an authentic conversation through the mobile communications device using the pre-programmed conversational script. 90

METHOD OF SIMULATING COMMUNICATION

BACKGROUND

1. Technical Field

The embodiments herein generally relate to remote communications, and, more particularly, to simulating remote communications.

2. Description of the Related Art

Use of mobile wireless devices has become prevalent in today's society and ranges from personal use by individuals to use for business purposes by professionals providing specialized advice. Some individuals find comfort in having a mobile wireless device for use in times of emergency. Other individuals find comfort and a feeling of increased safety in having such a device when traveling alone. Still other individuals want to be perceived in social settings as having some specialized skill. All of these individuals at certain times may desire to be perceived by persons in their immediate vicinity to be engaged in a conversation that is not, in fact, taking place. While any of these individuals may hold the mobile wireless device in a manner that mimics the use of such a device during a conversation and attempt to fake a conversation, such individuals often lack the necessary skill and ability to produce believable simulated communication.

SUMMARY

In view of the foregoing, an embodiment herein provides a method of simulating communication on a mobile communications device, the method comprising providing at least one pre-programmed conversational script on a storage device; selecting the at least one pre-programmed conversational script for playback on the mobile communications device at a predetermined time; receiving an incoming communications alert on the mobile communications device; reciting the selected at least one pre-programmed conversational script on the mobile communications device upon responding to the incoming communications alert; and simulating an authentic conversation through the mobile communications device using the at least one pre-programmed conversational script. In such a method, the authentic conversation may comprise any of a voice conversation, and a simulated voice mail.

In such a method, the storage device may be operatively connected to the mobile communications device. Moreover, such a method may further comprise associating an image with a voice that recites the at least one pre-programmed conversational script on the mobile communications device, wherein the image is displayed on a screen display of the mobile communications device. In addition, such a method may further comprise prompting the pre-programmed conversational script to playback on the mobile communications device prior to the predetermined time. Additionally, selecting the at least one pre-programmed conversational script for playback on the mobile communications device at a predetermined time may comprise disabling the playback at the predetermined time. The method may further comprise displaying the at least one pre-programmed conversational script on a screen display of the mobile communications device, wherein the displayed script is viewable only by a user of the mobile communications device.

Another embodiment herein provides a method of simulating communication on a mobile device, the method comprising configuring parameters of simulated communication on the mobile device, wherein the configuring comprises setting a type of communication and scheduling a date and time of the simulated communication as the parameters; storing the parameters on the mobile device; mimicking an incoming call at the scheduled date and time of the simulated communication; and upon answering the incoming call, simulating a communication on the mobile device in accordance with the type of communication.

In such a method, the simulated communication may comprise at least one of simulated telephony and simulated voice mail messages. Furthermore, the mobile device may comprise a multi-touch display, and wherein configuring the parameters comprises configuring the parameters using the multi-touch display. In addition, the mobile device may comprise an incoming telephone call alert, and wherein mimicking the incoming communication comprises mimicking the incoming telephone call alert on the mobile device. Additionally, the mobile device may comprise a microphone and a speaker, and wherein simulating a communication comprises playing a pre-recorded message through the speaker and responding to the pre-recorded message through the microphone. In one embodiment, the mobile device comprises a display screen that displays a script of a pre-recorded message. Preferably, the displayed script is viewable only by a user of the mobile device and not by third parties.

Such a method may further comprise waiting a pre-determined interval of time before playing the pre-recorded message through the speaker. Furthermore, the user of the mobile device ad-libs responses to the pre-recorded message according to an embodiment herein. In addition, playing the pre-recorded message through the speaker may comprise waiting until receiving input from the microphone to play the pre-recorded message through the speaker. Moreover, the mobile device may comprise a speakerphone and simulating a communication may comprise playing a pre-recorded message through the speakerphone and acknowledging the pre-recorded message through the speakerphone. Additionally, such a method may further comprise waiting a pre-determined interval of time before playing a pre-recorded message through the speakerphone. Such a method may further comprise repeating a script presented on the mobile device screen display but is not viewable by third parties, when in the speakerphone mode.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method of setting up, receiving and participating in a simulated conversation using a mobile device. Referring now to the drawings, and more particularly to FIGS. 1A through 5, where similar reference characters denote corresponding features consistently throughout the figures, there are shown preferred embodiments.

Figure 1A:
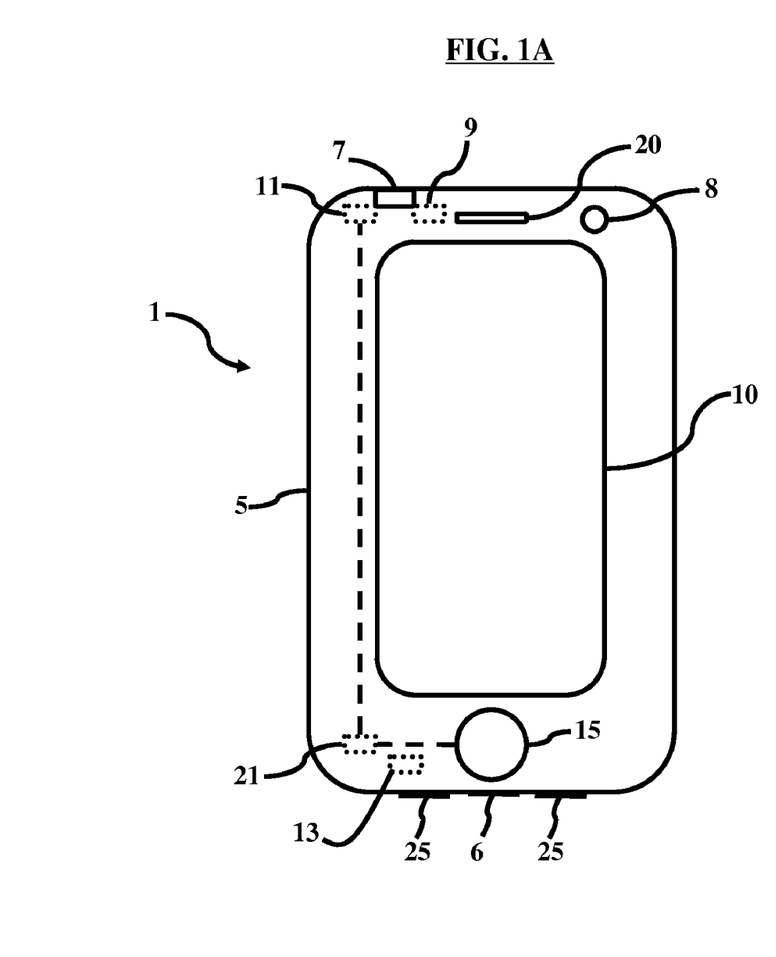
FIG. 1A illustrates a mobile wireless communication device according to an embodiment herein.
Figure 5:
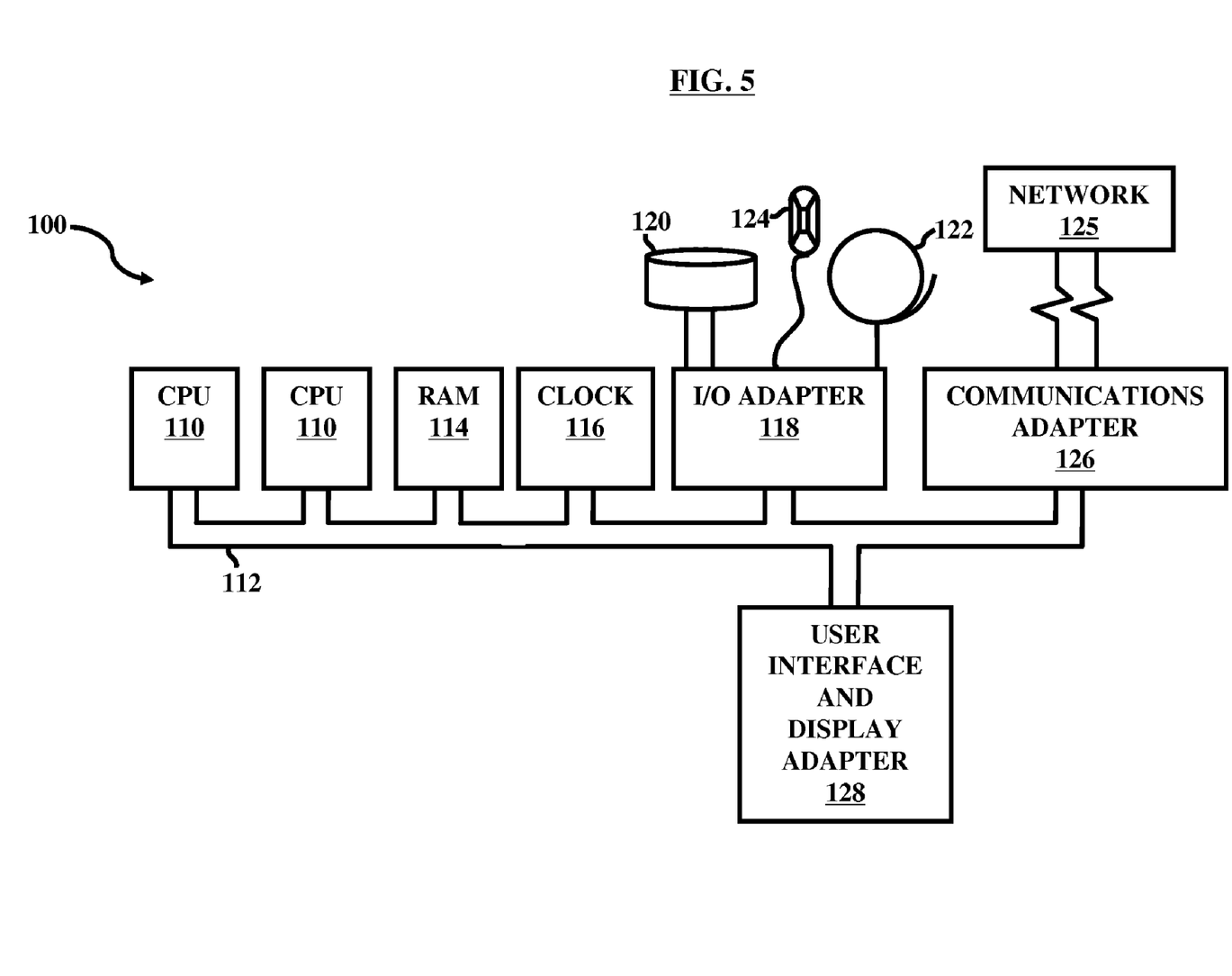
FIG. 5 illustrates a schematic diagram of a computer architecture used in accordance with the embodiments herein.

FIG. 1A, with reference to FIG. 5, illustrates a mobile wireless communication device according to an embodiment herein. Shown in FIG. 1A is a mobile communications device 1, illustrated as a cellular telephone, and comprising a telephone body 5, a multi-touch display screen 10, a general input button 15, a speaker 20, and microphones 25. The mobile device 1 also includes a speakerphone 6, an antenna 7, camera lens 8, a receiver 9, a transmitter 11 for communicating with a Mobile Telephone Switching Office ("MTSO"—e.g., a cell tower) 27, and a controller 13 for controlling the operation of the mobile device 1. One embodiment of controller 13 includes a microprocessor (e.g., CPU 110), a random access memory (e.g., RAM 114), and some form of read only memory (e.g., storage unit 120). In addition, those skilled in the art will recognize that the mobile device 1 may include any of a wide variety of wireless personal communication devices, including, but not limited to, cellular telephones, two-way radios, personal communicators, personal digital assistants, and hands-free communication devices that have cellular telephone capability.

Figure 1B:
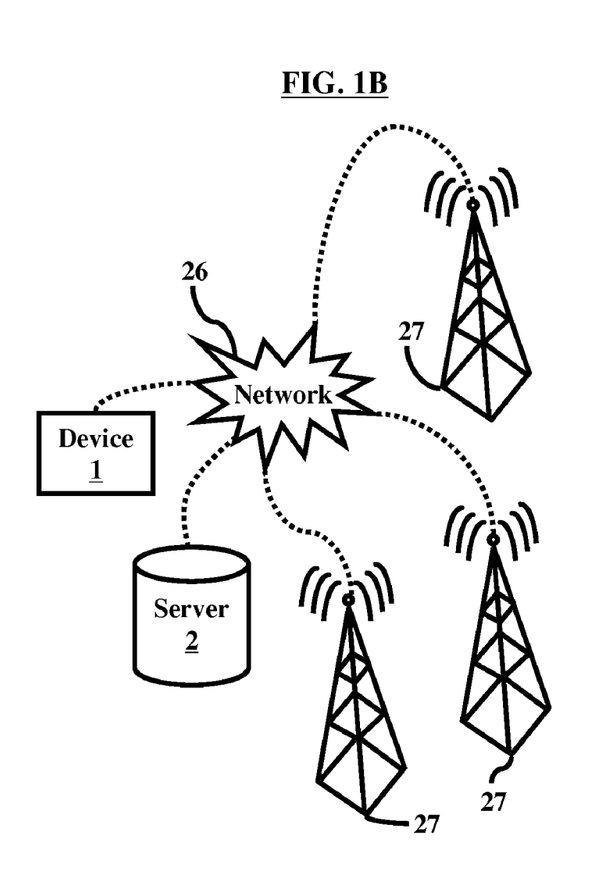
FIG. 1B illustrates a communications network according to an embodiment herein.

As shown in FIG. 1B, with reference to FIG. 1A, mobile device 1 is part of a communication network 26, which includes mobile device 1 and at least one MTSO 27. In one embodiment herein, antenna 7, receiver 9, and transmitter 11 of mobile device 1 communicate with at least one MTSO 27 over the cellular network 1. Specifically, an audio input, such as microphones 25, carries voice input from a user (or other voice/data input source) through a mute control device 21 into the transmitter 11 of mobile device 1. In one embodiment herein, the mute control device 21 is configured as an on/off switch used to control when voice provided by the microphone 25 is passed to the transmitter 11, and its configuration is familiar to those skilled in the art. In addition, the mute control device 21 is controlled by controller 13 in one embodiment of mobile device 1 and the mute control device 21 selectably passes audio input to transmitter 11 for transmission from mobile device 1 to a MTSO 27. In addition, mobile device 1 modulates the voice (as received from microphones 25) onto a carrier (not shown), in a manner well-known to those skilled in the art, and passes the voice-modulated signal to the antenna 7.

Additional embodiments of mobile device 1 accommodate data transmissions as well as telephony (e.g., packet-based data communications, Internet access, voice mail, etc.). For example, in one embodiment herein digitized data signals are passed to the controller 13 of mobile device 1. Thereafter, the controller 13 outputs the digitized data onto display device 10 (e.g. using user interface and display adaptor 128 of FIG. 4) or performs other functions with the digitized data. The receipt, demodulation, and processing of voice and digitized data through a receiver 9 are well-known to those skilled in the art. Furthermore, the various components of the mobile device 1 (e.g., speakerphone 6, antenna 7, camera lens 8, receiver 9, display device 10, transmitter 11, controller 13, general input button 15, speaker 20, mute control device 21, and microphones 25, etc.) may be arranged in any suitable configuration, and the embodiments herein are not restricted to one particular arrangement. Furthermore, the various components of mobile device 1 as illustrated in the drawings are not necessarily drawn to scale.

Figure 2:
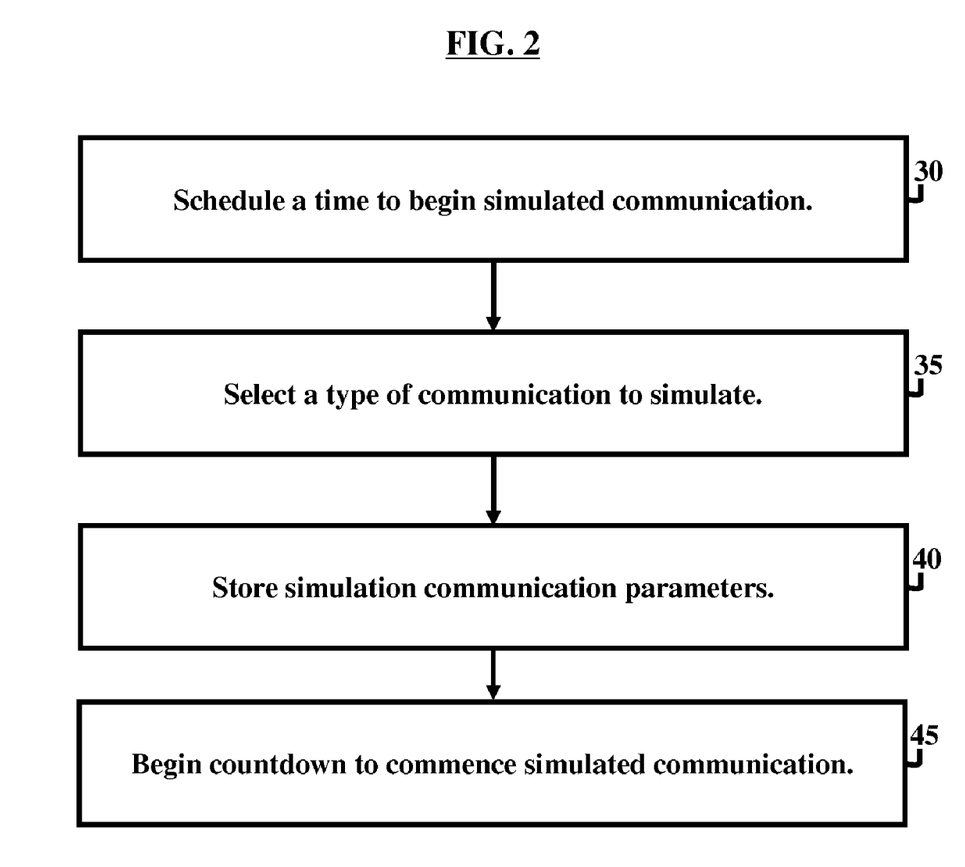
FIG. 2 is a flow diagram illustrating a call set-up process according to an embodiment herein.

FIG. 2, with reference to FIGS. 1A and 5, is a flow diagram illustrating a call set-up process according to an embodiment herein. Step 30 of the method of FIG. 2 describes scheduling a time (e.g., using multi-touch display 10) for providing simulated communication. Step 35 describes selecting a type of communication to simulate (e.g., using multi-touch display 10). Step 40 describes storing the simulated communication parameters (e.g., in storage unit 120). Next, in step 45, the method of FIG. 2 begins a countdown (e.g., using clock 116) to commence the configured simulated communication (e.g., as configured in step 40).

Figure 3:
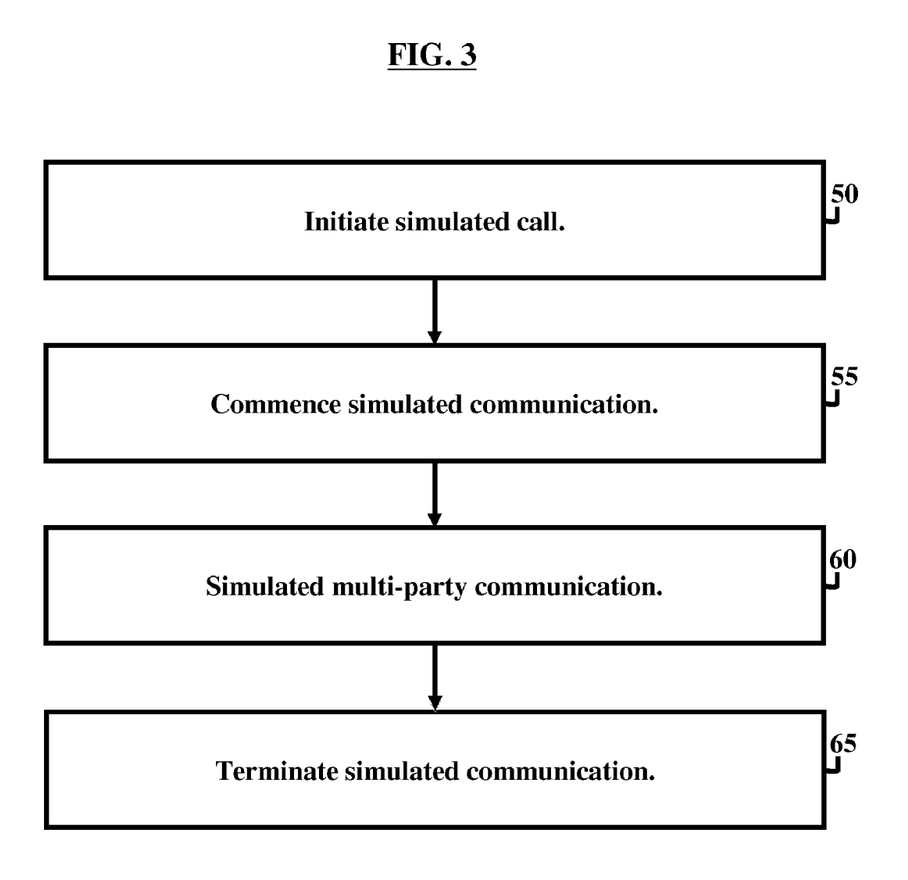
FIG. 3 is a flow diagram illustrating a call execution process according to an embodiment herein.

FIG. 3, with reference to FIGS. 1A, 2, and 5, is a flow diagram illustrating a call execution process according to an embodiment herein. Step 50 of the method of FIG. 3 describes initiating a simulated call (e.g., using speaker 20 as described below). Step 55 describes commencing a simulated communication (e.g., using microphone 25 as described below). Step 60 describes simulating a multi-party communication (e.g., using speaker 20 and microphone 25 as described below). Next, at step 65, the method of FIG. 3 describes terminating the simulated communication (e.g., using general input button 15 as described below).

The simulated communications process shown in FIGS. 2 through 3 can be configured in a number of different ways, depending on user preferences. Some examples of different configurations are listed below; however such examples are not an inclusive list of all variations and adaptations of the embodiments herein.

For example, according to one embodiment herein, a user accesses a screen display (e.g., multi-touch display 10) of a mobile wireless device (e.g., mobile device 1) to configure a simulated communication (e.g., as described in step 30) on the mobile device 1 at a pre-arranged time. In such an embodiment, the user selects from various types of simulated communications (e.g., as described in step 35) during configuration. Thereafter, a simulated communication begins at the pre-arranged time (e.g., as shown in FIG. 3). For example, the user can arrange a call to be made immediately or at a pre-arranged time in the future. In one embodiment of a simulated communication, the mobile device 1 mimics an incoming call (e.g., by providing a ringtone or incoming message alert through speaker 20) at the pre-arranged time (e.g., as described in step 30). For example, the user answers his or her mobile device 1 in the same manner as he or she would answer any other call. Thereafter, upon answering, embodiments herein playback lines of pre-recorded script stored locally on storage device 120 (of FIG. 5), which may comprise flash memory, or stored remotely on a server 2 (of FIG. 1B) or stored remotely on any other device (not shown) communicatively linked to device 1 or server 2 or the network 26. The line playback occurs through a speaker (e.g., speaker 20) at specifically timed intervals, where the playback lines are selected based on the previously selected type of simulated communication (e.g., as described in step 35). Thus, for example, upon answering the simulated incoming call, the user may use a standard greeting such as "hello" or the user may ad-lib with other standard greetings. In addition, in certain embodiments herein, a photo of the incoming caller may be displayed to give the appearance from whom that the user is receiving a call (e.g., the photo of an individual that the user knows or a famous individual or a fictitious image, etc.).

Once the user has initially responded to the simulated incoming call (e.g., by using multi-touch display 10 to answer the incoming call) and issues a greeting, the user is prompted to repeat each of the lines played, thereby creating an illusion of a conversation with another party (via mobile device 1) on the appropriate topic. For example, after the simulated incoming call is answered, lines of script from a recorded message for the selected type of simulated communication are played at intervals. The user is prompted to repeat each of the lines played so as to create the illusion of a conversation on the selected topic (e.g., as described in step 35). For example, the user may be repeating lines of script designed to make the user appear to be speaking with a doctor, lawyer, sports agent, fashion designer, other professional, or any other individual to third parties overhearing the simulated conversation.

In one embodiment, once the simulated incoming call is answered, lines of a script from a pre-recorded message for the selected type of simulated conversation (e.g., as described in step 35) are played at intervals via the speaker (e.g., speaker 20) on the mobile device 1. With third parties now capable of listening to the entire call, the user can ad-lib his or her replies so as to appear to be conversing with another individual. Additionally, in an alternative embodiment, the script that is to be repeated by the user is displayed on the display screen 10 of the mobile device 1, which may be hidden from view of third parties who are near the user. For example, the script may be viewed only during a short duration of time or if looking straight on the display screen 10 and would appear hidden if viewed from an angle, etc.

As another example, a user repeats a script designed to create the appearance that the user is required to leave immediately. Such an embodiment may be useful, for example, when the user wants to appear to have a viable excuse to leave a social engagement (e.g., a date or meeting).

As a further example, the user may be concerned about his or her safety in walking or traveling alone, and repeats the script of the simulated conversation to enhance his or her safety. For example, the user may create the appearance to unwanted parties (e.g., parties that may threaten his or her life) that he or she is having a conversation with law enforcement officials. The user can then ad-lib his or her own lines at any time during the simulated conversation.

Another embodiment includes establishing a service that provides a plurality of different selectable pre-configured scripts from which a user may select. Such scripts may be stored locally on device 1 or remotely on server 2 or any other device (not shown) communicatively linked to device 1 or server 2 or network 26. For example, a website may provide several different types of scripts which may be programmed to be played on the device 1. Prior to playback, a user may select the script (or scripts) that shall be played on the device 1.

Another embodiment allows a user to initialize an incoming call without having a pre-arranged time for such call to occur. For example, in an emergency setting or in a setting where a user is suddenly put in a situation where he/she desires to receive a call, but did not anticipate having to pre-arrange such a call to take place, the user may simply select an initializing sequence (i.e., through the touch screen 10 or the button 15 or through a voice prompt or through a visual prompt) to alert the script program to initialize a call. In such an embodiment, the user may provide additional prompts (either audio prompts or by selecting certain buttons on the touch screen 10 or any other buttons on the device 1) that alerts the script program to select a certain pre-programmed conversational script. Here, the user may pre-program a specialized prompt such that whenever it is uttered by the user, the script program will automatically select a particular script. For example, the user may have an "exit" prompt such that if the user says "hello mom, is there anything wrong?" then the script program automatically selects a pre-programmed script that recites a conversation between the user and a female voice that indicates there is an emergency and that the user must leave (i.e., exit) his location at once. In such an embodiment, once the "exit" prompt is articulated by the user, the image on the touch screen 10 automatically displays an image of the user's mother, for example, which is pre-programmed on the mobile device 1, server 2, or other device that is linked to the device 1 or server 2 or network 26. Again, this allows flexibility and a pseudo artificial intelligence associated with the script program.

Figure 4:
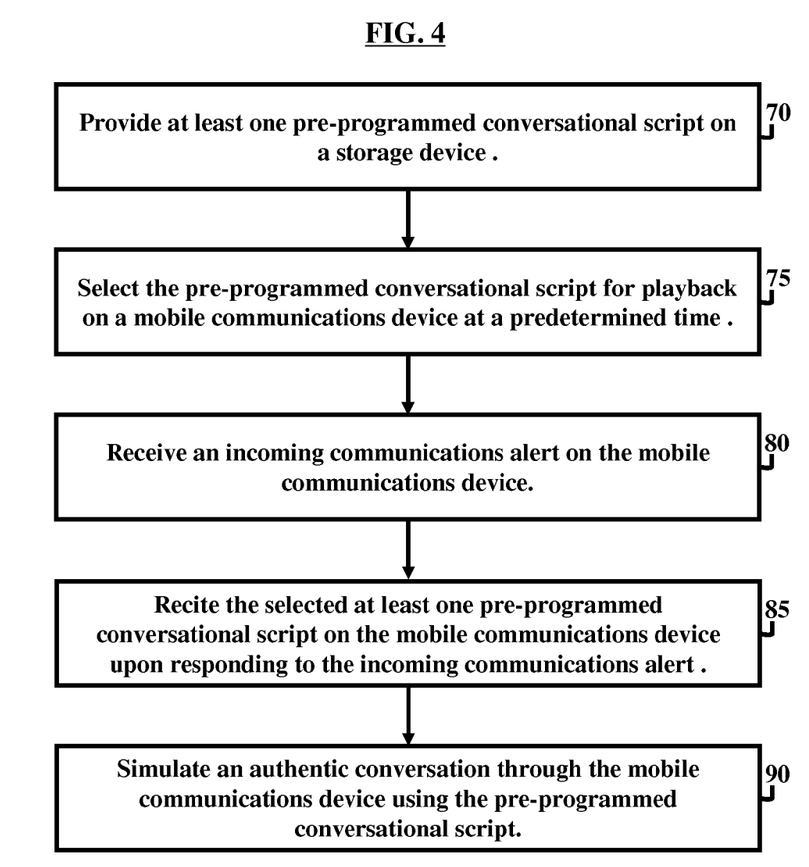
FIG. 4 illustrates a flow diagram of a simulated communication method according to an embodiment herein.

FIG. 4, with reference to FIGS. 1A through 3 and 5, illustrates a method of simulating communication on a mobile communications device 1 according to an embodiment herein. In step 70, the method of FIG. 4 describes providing at least one pre-programmed conversational script on a storage device (e.g., storage unit 120, shown in FIG. 5). The storage device may be configured in the mobile device 1 itself or it may be remotely located from the device 1. For example, the storage device may reside on server 2, or on any other device communicatively linked to mobile device 1, server 2, or network 26. Step 75 describes selecting the at least one pre-programmed conversational script for playback on a mobile communications device (e.g., mobile device 1) at a predetermined time. The conversational script may be pre-programmed and stored on the storage device and selected by the user prior to use. For example, the user may access different types of scripts through a website and select the script(s) that the user desires. In addition, the user may establish a user profile to help in establishing/selecting the script(s).

In addition, step 75 further allows selecting a predetermined time that is randomly selected. Here, the user may establish that the incoming call is received at a random or unexpected time or that several calls are received during a given timeframe. For example, if the user knows it will be in a social setting (e.g., a party) for a three hour period and wants to give the appearance of constantly receiving telephone calls or voice mails, etc., then the user may establish that the incoming calls randomly occur over that three hour period.

Step 80 describes receiving an incoming communications alert on the mobile communications device 1. Here, the incoming communications alert may take the form of a telephone ringtone, beep/tone, vibration alert, etc. The user may also select a predetermined specialized alert (e.g., a unique ringtone, etc.) so the user will know that the incoming call/message constitutes a simulated, script-generated call/message. Step 85 describes reciting the selected at least one pre-programmed conversational script on the mobile communications device 1 upon responding to the incoming communications alert (e.g., using a multi-touch display screen 10 or button 15, or voice response, etc.). In this regard, the device 1 recites (i.e., plays back) the pre-programmed script once the user responds to the incoming ringtone, beep, vibration alert, etc. The user may also select automatic recitation of the pre-programmed script without the user having to physically respond to the incoming communications alert.

Next, the method of FIG. 4 describes simulating (step 90) an authentic conversation through the mobile communications device 1 using the at least one pre-programmed conversational script. This simulation may include the user mimicking what the pre-programmed script recites or the user speaking in an impromptu/ad-lib manner. Specifically, the method may comprise repeating the at least one pre-programmed conversational script upon the at least one pre-programmed conversational script being recited on the mobile communications device 1. In such a method, the authentic conversation may comprise any of a voice conversation and voice mail, among other types of electronic communications.

The embodiments herein comprise both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code that must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 5, with reference to FIGS. 1A through 4. This schematic drawing illustrates a hardware configuration of an information handling/computer system 100 in accordance with the embodiments herein. The system 100 comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as peripheral storage unit 120, headphones 124, peripheral camera unit 122, or other devices that are usable by system 100. System 100 can also read the inventive instructions on the program storage devices and follow these instructions to execute the methodology of the embodiments herein. System 100 further includes a user interface and display adapter 128 that connects input devices, output device, and/or a combination of input/output devices to bus 112. In one embodiment, for example, user interface and display adapter 128 connects multi-touch device 10 (shown in FIG. 1A) to the bus 112 to gather user input. Additionally, a communication adapter 126 connects the bus 112 to a data processing network 125.

The embodiments herein offer a unique approach to communications by providing a simulated conversation method and system whereby a user may engage in a simulated conversation through a mobile device 1. Those of ordinary skill in the art have developed different mechanisms of interacting with a mobile device 1. However, the embodiments herein provide a unique approach that those of ordinary skill in the art would not have likely developed in the past because mobile wireless carriers charge (either per usage or through a mobile use plan) for receiving incoming calls/messages on a mobile device 1. Therefore, those of ordinary skill in the art would tend not to develop products that might add cost to a user's mobile device experience.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of simulating communication on a mobile communications device, said method comprising:

providing at least one pre-programmed conversational script on a storage device, wherein said storage device comprises at least one or more of a local storage device and a remote storage device, and wherein said at least one pre-programmed conversational script comprises intervals whereby playing of said at least one pre-programmed conversational script simulates a real-life conversation;

selecting said at least one pre-programmed conversational script for playback on said mobile communications device at one or more of a predetermined time, a random time, and at an occurrence of an emergency;

receiving an incoming communications alert on said mobile communications device, wherein said alert is preconfigured from one or more of a telephone ringtone, a beep/tone, and a vibration alert;

reciting the selected at least one pre-programmed conversational script from said storage device on said mobile communications device upon responding to said incoming communications alert; and simulating an authentic conversation through said mobile communications device using said at least one pre-programmed conversational script, wherein a user of said mobile communications device is aware that the conversation script is pre-programmed on said storage device.

2. The method of claim 1, wherein said authentic conversation comprises any of a voice conversation and a simulated voice mail message that is stored on said storage device.

3. The method of claim 1, further comprising repeating said at least one pre-programmed conversational script upon said at least one pre-programmed conversational script being recited on said mobile communications device.

4. The method of claim 1, wherein said storage device is operatively connected to said mobile communications device.

5. The method of claim 1, further comprising associating an image with a voice that recites said at least one pre-programmed conversational script on said mobile communications device, wherein said image is displayed on a screen display of said mobile communications device.

6. The method of claim 1, further comprising prompting said pre-programmed conversational script to playback on said mobile communications device prior to said predetermined time.

7. The method of claim 1, wherein the selecting said at least one pre-programmed conversational script for playback on said mobile communications device at a predetermined time comprises disabling said playback at said predetermined time.

8. The method of claim 1, further comprising displaying said at least one pre-programmed conversational script on a screen display of said mobile communications device, wherein the displayed script is viewable only by a user of said mobile communications device.

9. A method of simulating communication on a mobile device, said method comprising
    configuring parameters of simulated communication on said mobile device, wherein said configuring comprises setting a type of communication, setting a mechanism for communicating an occurrence of an emergency, setting a level of randomness while receiving the simulated communication, and scheduling a date and time of the simulated communication as said parameters;
    storing said parameters on said mobile device;
    mimicking an incoming call at the scheduled date and time of the simulated communication and based on the parameters of said simulated communication; and
    upon answering said incoming call, simulating a communication on said mobile device in accordance with said type of communication, wherein the simulated communication comprises intervals whereby playing of said simulated communication simulates a real-life conversation.

10. The method of claim 9, wherein said simulated communication comprises at least one of simulated telephony and voice mail.

11. The method of claim 9, wherein said mobile device comprises a multi-touch display, and wherein configuring said parameters comprises configuring said parameters using said multi-touch display.

12. The method of claim 9, wherein said mobile device comprises an incoming telephone call alert, and wherein mimicking said incoming communication comprises mimicking said incoming telephone call alert on said mobile device.

13. The method of claim 9, wherein said mobile device comprises a microphone and a speaker, and wherein simulating a communication comprises playing a pre-recorded message stored on a storage device through said speaker and responding to said pre-recorded message through said microphone.

14. The method of claim 9, wherein said mobile device comprises a display screen that displays a script of a pre-recorded message, and wherein the displayed script is viewable only by a user of said mobile device.

15. The method of claim 13, further comprising waiting a pre-determined interval of time before playing said pre-recorded message through said speaker.

16. The method of claim 13, wherein playing said pre-recorded message through said speaker comprises waiting until receiving input from said microphone to play said pre-recorded message through said speaker.

17. The method of claim 9, wherein said mobile device comprises a microphone and a speakerphone, and wherein simulating a communication comprises playing a pre-recorded message through said speakerphone and acknowledging said pre-recorded message through said speakerphone based on an input received from said microphone.

18. The method of claim 17, further comprising waiting a pre-determined interval of time before playing a pre-recorded message through said speakerphone.

19. The method of claim 17, wherein playing said pre-recorded message through said speakerphone comprises waiting until receiving input from said microphone to play said pre-recorded message through said speakerphone.

20. A method of simulating communication on a mobile communications device, said method comprising:
    providing at least one pre-programmed conversational script on a storage device, wherein said storage device comprises at least one or more of a local storage device and a remote storage device, and wherein said at least one pre-programmed conversational script comprises intervals whereby playing of said at least one pre-programmed conversational script simulates a real-life conversation;
    selecting said at least one pre-programmed conversational script for playback on said mobile communications device at a predetermined time, wherein the selecting said at least one pre-programmed conversational script for playback on said mobile communications device at a predetermined time comprises disabling said playback at said predetermined time;
    receiving an incoming communications alert on said mobile communications device;
    associating an image with a voice that recites said at least one pre-programmed conversational script on said mobile communications device, wherein said image is displayed on a screen display of said mobile communications device;
    reciting the selected at least one pre-programmed conversational script from said storage device on said mobile communications device upon responding to said incoming communications alert;
    displaying said at least one pre-programmed conversational script on a screen display of said mobile communications device, wherein the displayed script is viewable only by a user of said mobile communications device;
    simulating an authentic conversation through said mobile communications device using said at least one pre-programmed conversational script, wherein said mobile device comprises a microphone and a speaker, and wherein simulating a communication comprises playing said pre-programmed conversational script stored on said storage device through said speaker and responding to said pre-recorded message through said microphone, acknowledging said pre-programmed conversational script through said speaker based on an input received from said microphone; and
waiting a pre-determined interval of time before playing said pre-programmed conversational script through said speaker,
wherein playing said pre-programmed conversational script through said speakerphone comprises waiting until receiving input from said microphone to play said pre-programmed conversational script through said speaker.

* * * * *